Figure 1:
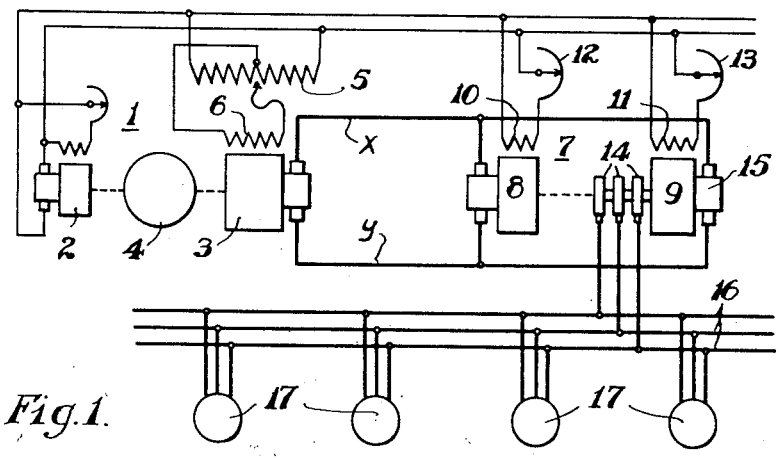

March 12, 1957     D. I. BOHN     2,785,363
ROTARY INVERTER POWER CONVERSION SYSTEM
Filed Dec. 8, 1953

INVENTOR
Donald I. Bohn
BY
Howard B. Funk
ATTORNEY

United States Patent Office 2,785,363
Patented Mar. 12, 1957

2,785,363

ROTARY INVERTER POWER CONVERSION SYSTEM

Donald I. Bohn, Pittsburgh, Pa., assignor to Aluminum Company of America, Pittsburgh, Pa., a corporation of Pennsylvania Application December 8, 1953, Serial No. 396,969

12 Claims. (Cl. 318—148)

This invention relates to an electrical power conversion system, particularly to a system for the conversion of variable voltage direct current power to a biased voltage variable frequency alternating current power supply for effecting high torque starting and synchronization of alternating current motors.

For the purpose of denoting a presently employed practical use of the invention, but not with the intention of limiting the invention to a particular use, reference is made to a rolling mill, such as a breakdown mill, which is practically continually varying in speed, as well as reversing, to subject a hot metal slab to a series of breakdown passes. Associated with the mill are entering and exiting groups of conveyors or roll table rolls with a driving motor for each roll directly coupled thereto. A relatively close degree of peripheral speed synchronization is required between the mill rolls and the table rolls. This requirement imposes a severe duty upon the roll table motors in starting under load, following the speed changes and reversals of the mill driving motor and maintaining a satisfactory speed relationship, especially since the speed of the roll table motors is very low. The use of direct current motors supplied by means of the well-known Ward-Leonard variable voltage system is not fully satisfactory, because at the low speed involved their IR drop is relatively high which results in a poor speed regulation. The use of alternating current motors is highly desirable from the standpoint of cost and maintenance, but has not been practical heretofore, the most serious difficulty being that the usual full range variable frequency source for supplying the motors, such as an alternator driven by a D. C. motor fed from a variable voltage motor-generator set, imposes limitations on the rate of change of frequency and supplies a voltage whose magnitude is substantially proportional to frequency, with zero voltage at zero frequency. Hence, even if high-slip squirrel cage motors are used and are supplied from such a source, they are unable to start and assume even a close approximation to the desired speed relationship until a frequency of several cycles is reached. In addition, the high-slip built into these motors, to permit them to have sufficient torque to accelerate quickly when their speed is considerably spaced from the frequency, makes their normal speed regulation so poor that load or voltage changes appreciably harm attempts at obtaining the desired speed relationship with the mill. Moreover, a further drawback exists due to the fact that the total $WK^2$ (where K is the radius of gyration and W is the weight or mass of a rotating body) of the rotatable parts of the variable frequency motor-alternator set is so high that it is simply impossible for the torque of the motor driving the alternator to be high enough to allow the motor-alternator set to follow rapid changes in mill speed. This is because, in addition to the $WK^2$ of the alternator which is relatively high, the motor driving the alternator must be large enough to provide the total energy input for all of the roll table or load motors. It also must have sufficient torque to attempt to reach a satisfactory acceleration. Actually, it is economically impossible to design such a motor-alternator set with the desired high values of acceleration.

A primary object of the invention therefore is to provide a combination and arrangement of apparatus which shall be effective for supplying alternating current motors with biased voltage, variable frequency, alternating current energy.

Another object is to provide an alternating current supply system of the above-mentioned character and control which shall be effective for enabling essentially constant speed polyphase alternating current motors to be started under load and run at low speeds or accelerated to top speed with high torque over the entire speed range.

A further object is to provide a direct current to alternating current power conversion system for making available a biased voltage, variable frequency source of polyphase power in such a manner that substantially no limitations are imposed on the rate of change of frequency and therefore of acceleration of A. C. motors supplied by the system.

Still another object is to so arrange a D. C. to A. C. power conversion system that synchronous and squirrel cage motors may be effectively and conveniently started under load from rest and caused to follow at almost any desired speed relationship or synchronization the variable speed pattern of a master rotary device.

Figure 2:
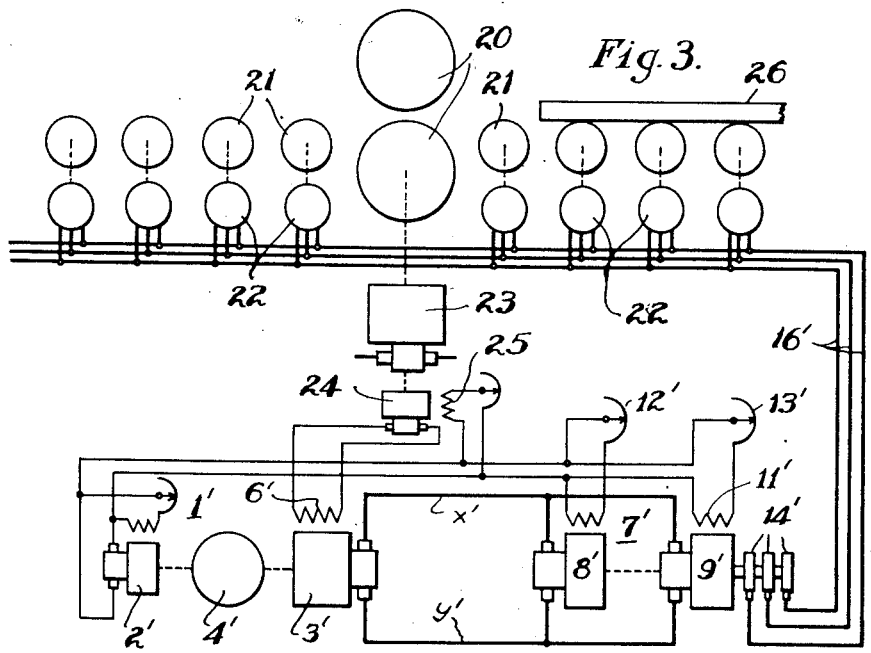
Figure 2:
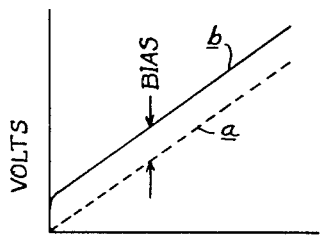

The invention will, however, be best understood from the following detailed description when considered in conjunction with the accompanying drawing, wherein:

Fig. 1 is a diagrammatic illustration of a system embodying the invention, and providing a biased voltage variable frequency alternating current power supply;

Fig. 2 is a graph showing a biased relation of voltage to frequency which the invention is designed to provide, and Figure 3 is a schematic view similar to Fig. 1, but showing a modification wherein a multiplicity of roll table drive motors associated with a reversible rolling mill are caused automatically to follow the variable speed and direction pattern of the mill driving motor, the table roll driving motors constituting slave motors following the pattern of the master mill driving motor.

Referring to the drawing and particularly to Fig. 2, the dotted line curve $a$ indicates a variable frequency source of alternating current which provides a voltage proportional to frequency, as is supplied by an alternator having its field excited at a fixed value and having its speed varied from zero to maximum. Unfortunately, such a power supply is not satisfactory for the operation of A. C. motors which must start loads from standstill or must remain in synchronism under various load conditions between the respective motors or under speed changes of any rotary device whose speed they should follow, for the reasons hereinabove described. In this figure, the full line curve $b$ indicates a variable frequency alternating current power supply whose voltage is continually, positively biased in magnitude with respect to the frequency. That is, the bias, as indicated by the arrows, represents a voltage which is added to the proportional to frequency voltage represented by line $a$. This biased type of supply is especially suitable for operating A. C. motors from rest and over a wide speed range, particularly at low speeds, with effective torque and close speed regulation, because there is always, at any frequency, a sufficient voltage present to force each motor to operate on the nearly synchronous part of its speed-torque curve. Actual use shows that with such a bias voltage supply, motors will start from rest carrying normal-rated load with almost perfect synchronization, and the same is true during deceleration. This type of supply is moreover extremely desirable when the motors are to be started and run at a relatively slow speed with respect to their full load speed, since the magnitude of the voltage bias at the lower frequencies may be made to represent a much larger proportion of the applied voltage than that voltage which is proportional to frequency. Accordingly, substantially full load currents can be caused to circulate in the motors to create substantially full load torque so that they will readily start under load and remain in synchronism as they follow the changes in frequency.

The invention, therefore, is a method and system which provides the bias voltage curve of Fig. 1, or a curve generally similar thereto.

Referring to Fig. 1, which illustrates an exemplary embodiment of the invention, the numeral 1 indicates, in general, a source of variable voltage direct current power, preferably in the form of a motor-generator set comprising a constant voltage exciter 2, a variable voltage D. C. generator 3 and a driving motor 4 therefor. Motor 4 may be of any suitable type such as a synchronous motor or a squirrel cage motor supplied from a suitable power source, not shown. The exciter 2 supplies field current to generator field 6 through a potentiometer type rheostat 5 by means of which the output voltage of generator 3 may be changed incrementally from a maximum with one polarity through zero and to a maximum of the opposite polarity. In accordance with this invention the capacity of the generator 3 will be such that it will supply the entire electrical load including the A. C. load which is connected to the system, the direct current power from the generator being converted into alternating current to supply the A. C. load.

This variable D. C. voltage is supplied, in parallel, through conductors $x$ and $y$ to two electrical machines having their shafts mechanically connected together, the unit being indicated by the numeral 7. One machine of this unit is a motor or generator 8, hereinafter termed a dynamo or a D. C. machine because it functions either as a motor or a generator, and the other is a rotary inverter 9, each having a separately excited shunt field 10 and 11, respectively, supplied through suitable field adjusting rheostats 12 and 13, respectively, from the exciter 2. The inverter 9 has a plurality of slip rings 14 in addition to its commutator 15 both electrically connected to the armature winding of the inverter, as is well known in the art. The slip rings are connected to a polyphase distribution or feeder circuit 16 to which in turn are connected the primary windings of a plurality of A. C. motors 17. Such motors may be either synchronous motors or induction motors.

In operation, it may be assumed that the motor 4 is operating and the exciter 2 is delivering excitation current to the various fields. With the movable member of the rheostat 5 in neutral position, as indicated, the generator field 6 will be deenergized so that the generator 3 will be delivering no effective voltage. By operating the arm of the rheostat 5 in one direction or the other, the generator field 6 will become excited and a voltage will rapidly be built up in the circuit supplying the two machines 8 and 9 of the unit 7. They will start to accelerate and will reach a speed determined by the magnitude of the voltage applied thereto. Obviously, the speed of the inverter regulates the frequency of its A. C. output and thus the speed of the motors 17.

Initially and before the unit 7 has appreciably accelerated, the D. C. voltage applied to the inverter 9 appears at the slip rings 14 of the inverter and in the primary or stator windings of the motors 17 as three phase voltage with zero phase rotation, and it represents a bias voltage causing initial circulation of current of zero phase rotation through the primary windings of the motors 17. The value of this bias is determined by the inertia or total $WK^2$ of the unit 7 and the IR drop in the armature of the inverter 9. While unit 7 must necessarily possess a certain $WK^2$, and obviously during acceleration the value of this $WK^2$ will affect the value of bias, the dynamo 8 is available to produce a torque or a counter-torque to modify the effect of $WK^2$ with respect to bias. By means of the dynamo, any desired bias can be produced for both positive and negative accelerations. Thus, the separately excited D. C. machine or dynamo 8 is a torque controlling or modifying device. Its function is to provide, by adjustment of its field 10 in relation to the adjustment of field 11 of the inverter, whatever torque, either as a motor or as a generator, is required during acceleration and deceleration to force the inverter 9 to provide and maintain the magnitude or value of bias desired. As a result, this permits any desired predetermined value of voltage bias to be applied to the load motors 17 and cause current to circulate therethrough and create the value of torque desired at all speeds down to a full stop. The current supplied to the motors 17 due to this bias is substantially independent of load or torque on the motors 17 at low motor speeds and is essential for their operation at such speeds.

Preferably, the fields of the dynamo 8 and the inverter 9 will be so adjusted relative to each other that the inverter will be caused to provide a bias sufficient to overcome the IR drop of the load motors 17 and circulate substantially full load current therein at starting and during relatively low speed running of the motors 17 and also during acceleration thereof. Thus, at any speed of the unit 7, this value of bias will be present to enable the inertia of the motors 17 and their loads to be overcome whenever any speed change is required of them. This results in enabling the motors 17 to be started substantially in synchronism while carrying normal-rated load and run at speeds represented by a supply frequency of several cycles or even fractional cycles, if desired.

Stating the afore-described fundamentals of operation in other words, the variable voltage D. C. power supply 3 is converted by the rotary inverter 9 to A. C. power for synchronous, variable speed operation of the load motors 17 from zero to rated frequency. The inverter in respects of its rotatable parts has $WK^2$ or inertia of a determinable magnitude which represents a load (disregarding the machine 8 for a moment), owing to which its speed will always lag behind the speed represented by the impressed D. C. voltage and the inverter field during periods of starting and acceleration. This lag represents flow of load current through the armature winding of the inverter, since such current flow and hence torque in such armature in the direction to give motor action is required to overcome the load. This load or motor current provides a current-resistance voltage drop, or IR drop, in the armature winding; R being the resistance of the armature winding and I being the armature current. This IR voltage drop is reflected as a slip ring voltage impressed on the load motors 17 being operated from the system, and it represents a bias voltage causing current to circulate through the primary windings of the motors 17. At inverter standstill, the bias voltage is of zero frequency and hence the current due to this voltage is of zero phase rotation and does not cause the motors 17 to rotate, but to lock against rotation until the inverter starts to rotate, whereupon an alternating voltage proportional to speed and hence frequency, plus the bias voltage appears at the slip rings of the inverter.

Thus, during periods of starting and acceleration of the inverter, the load current flowing through the armature winding of the inverter from the supply source 3 will give a bias voltage, and its magnitude will be equal to the IR drop of this current in the inverter. Until the inverter starts to rotate, only the bias voltage will appear at the slip rings, whereupon it is supplemented by the alternating voltage which is generated responsively to such rotation. The frequency of this output voltage, of course, increases uniformly or steplessly with the increase in inverter speed.

Now, while the current for accelerating the inverter will provide a bias voltage, such voltage is a non-adjustable quantity which varies over a wide range, dependent on the $WK^2$ and the rate of acceleration of the inverter. Moreover, when the inverter reaches a steady running speed, determined by the magnitude of the impressed D. C. voltage (constant field strength being assumed), the accelerating current and hence torque requirements of the inverter would substantially disappear and the bias voltage would accordingly become a negligible amount, except for the influence of dynamo 8. This machine enables the bias voltage to be adjustably controlled and maintained at desired value at any inverter speed, beginning at zero speed, and up to full speed, if desired. Ordinarily, the bias voltage will be made sufficient to cause full load current to circulate through the load motors. The bias voltage is essential for synchronous high torque starting and running of the load motors at low frequency speeds with respect to their normal frequency speed and for their operation in synchronism with the inverter from zero to rated frequency.

It is to be noticed that the armature of this machine 8 is fed from the supply source 3. Now, by adjustment of its field relative to the field of the inverter, it is made to control the acceleration rate of the inverter by adding to or subtracting from the inertia of the latter; that is, it is caused to operate as a drag generator or as a drive motor, depending upon whether $WK^2$ is required to be added to or subtracted from the inverter. In case it loads the inverter, as in the case of a low inertia unit, the effect is like increasing the $WK^2$ and the current and hence torque requirements of the inverter, thereby causing the bias voltage to be of increased value by the amount desired, due to the greater motor current flow in the inverter armature required to accelerate the additional load. In the case that it operates as a motor and helps to drive the inverter, as in a high power capacity unit of large inertia, the opposite effect is produced, since the inverter takes less motor current, and the bias voltage is reduced to the desired value. A satisfactory acceleration rate for such high inertia unit is also realized, since the torque requirements for acceleration is provided by the machine 8. It is thus apparent that whatever torque, either positive or negative, dynamo 8 imparts to the inverter 9 adds or subtracts $WK^2$ and in effect creates an artificial load current flow in the armature of the inverter in respects of the load current flow which would otherwise occur therein.

Since both machines 8 and 9 of unit 7 are fed from the same source 3, by suitable relative adjustment of the fields 10 and 11 thereof, the influence or effect of machine 8 on the inverter 9 in controlling the bias voltage magnitude can be made to persist upon the unit reaching the steady running speed called for by the setting of the rheostat 5. In that case where machine 8 is acting as a drag generator initially, while not necessary, its field may be adjusted, if desired, in order to vary the amount of bias voltage produced at steady running speed. In that case where machine 8 is used to drive the inverter, upon reaching steady running speed, its field should be adjusted to cause it to impose load on the inverter. In consequence, by the action of the machine 8 on the inverter 9, the bias voltage is artificially increased or decreased to desired value and is made to be present at any steady running speed of the inverter or unit 7.

Thus, by the interaction of the two machines 8 and 9 of unit 7, the motors 17 are initially supplied from the D. C. source 3 with polyphase energy comprised of a bias voltage component of a controlled magnitude and of zero frequency, and a proportional voltage to frequency component. The latter appears responsively to start of rotation of the inverter and, due to the influence of machine 8 on the inverter, the relationship of the two components is maintained during acceleration and constant speed running of the unit 7.

The foregoing explains the operation in the accelerating direction, and it will be appreciated that a similar action in the reverse sense occurs upon deceleration. Slowdown of the unit 7 as the supply voltage is decreased is resisted by its $WK^2$ or inertia, but this kinetic energy of the unit is absorbed in driving machine 8 and the generated current from machine 8 having its field stronger than that of inverter 9 at this time causes current through 9 to continue to flow in the same direction as the running current and produce the bias voltage to force slow-down of the load motors 17.

The unit 7, primarily because the energy for operating the motors 17 is not supplied by machine 8 through its shaft, as in a conventional variable speed alternator set-up, but is supplied entirely electrically from generator 3 through inverter 9, is able to meet any acceleration demand and therefore to follow rapidly any change in generator voltage. In consequence, limitations on the rate of change of frequency and therefore of acceleration of the motors 17 are eliminated and the motors 17, under load, respond to any speed change required of them. By way of an example, if the unit 7 comprises a 62½ H. P. mill motor having a top speed of 600 R. P. M. and the inverter is rated at 75 kw. at this speed, the unit will accelerate from dead stop to full speed in ⅜ of a second with the motor pulling only 125% of its rating during this acceleration. Throughout, the bias voltage relative to frequency is present and the load motors 17 consequently will accelerate at the same rate. The result is that the response by the unit 7 and the motors 17 is substantially in synchronism with any changes in the setting of the rheostat 5.

Referring now to Fig. 3, the system of Fig. 1 is substantially duplicated herein but means are provided for causing exiting and entering roll table rolls driven by individual A. C. motors to respond automatically to variations in speed and reversals of a rolling mill. The rolls of the mill are indicated by the numeral 20, the roll table rolls are indicated by the numeral 21 and their driving motors by the numeral 22 and a suitable motor 23 is connected in conventional way to the mill rolls 20 to drive them. Suitably connected to the mill drive is a small generator 24 of either the permanent magnet tachometer type or a separately excited field type, the latter form being illustrated. The elements of the system which correspond to those illustrated in Fig. 1 are identified in Fig. 3 by the same reference numerals primed. Hence, the field 25 of generator 24 is energized from the exciter 2'. The output of generator 24 supplies the field 6' of the D. C. generator 3'. The generator 24 is driven at a speed proportional to mill speed, hence its output voltage is proportional to mill speed thereby exciting generator 3' at a value such that its voltage output is determined by the mill speed. This D. C. voltage is applied to the torque controlling and inverter elements of the unit 7', thereby providing in the distribution circuit 16' an A. C. power supply of biased voltage frequency relationship whereby the motors 22 are caused to follow in synchronism the changing speed and reversal pattern of the mill drive. Numeral 26 indicates a slab or billet of metal which is moved back and forth through the mill for the usual multiplicity of reduction or breakdown passes. In practice, it has been found that the loaded rolls on which the slab rests, start and run substantially in synchronism with the idle or unloaded rolls.

The invention, it will be noted, is particularly applicable to variable speed operation of essentially constant speed A. C. motors, either synchronous or induction motors, with a versatility of control comparable to that of the Ward-Leonard control for D. C. motors. This is because the provision of the continually biased voltage, variable frequency polyphase power supply, with the magnitude of voltage bias being readily adjustable to the proper amount for varying conditions of load, speed and acceleration, enables the A. C. motors to be started under load, run at low speeds or accelerated to top speed with substantially full load torque being developed over the entire range. Thus, the invention may advantageously be employed for the speed control of either a single A. C. motor or a multiplicity of them.

Fig. 1 indicates that the overall control of acceleration, deceleration, and speed of the A. C. motors is taken care of simply by the operation of rheostat 5. Fig. 3 indicates an expedient way of making this control automatic; but, of course, many other ways will suggest themselves to one skilled in the art in case it is desired to cause the motors 22 to operate in synchronism or in some desired speed relationship with a master rotary element, such as is exemplified by the mill motor 23. Hence, it should be apparent that the embodiments represented herein illustrate the principles of the invention and that the details of construction and use of the invention may be varied without departing from the spirit thereof except as defined in the appended claims.

What is claimed is:

1. A power conversion system of the character described comprising a source of variable direct current voltage, two commutator machines, each having an armature winding and a shaft mechanically connected to the shaft of the other, one of said machines being a rotary inverter and the other a dynamo, means connecting said source of variable D. C. voltage in parallel to the commutators of said machines whereby they operate at a speed determined by the magnitude of the applied voltage, said rotary inverter having its armature winding connected to a plurality of slip rings feeding an A. C. distribution circuit, at a frequency regulated by the speed of said machines, and separately excited fields for said machines energized at preselected values relative to each other, whereby to establish and maintain a biased voltage to frequency relationship in the A. C. power supplied to said distribution circuit.

2. A power conversion system of the character described comprising a rotary source of variable direct current voltage, two commutator machines, each having an armature winding and a shaft mechanically connected to the shaft of the other, one of said machines being a rotary inverter and the other a dynamo, means connecting said source of variable D. C. voltage in parallel to the commutators of said machines whereby they operate at a speed determined by the magnitude of the applied voltage, said rotary inverter having its armature winding connected to a plurality of slip rings feeding an A. C. distribution circuit, at a frequency regulated by the speed of said machines, separately excited fields for said machines and means for energizing said fields at preselected values relative to each other to cause one of said machines to drive the other when said D. C. voltage is applied thereto.

3. A power conversion system of the character described comprising a rotary source of variable direct current voltage, two commutator machines, each having an armature winding and a shaft mechanically connected to the shaft of the other, one of said machines being a rotary inverter and the other a dynamo, means connecting said source of variable D. C. voltage in parallel to the commutators of said machines whereby they operate at a speed determined by the magnitude of the applied voltage, said rotary inverter having its armature winding connected to a plurality of slip rings feeding an A. C. distribution circuit, at a frequency regulated by the speed of said machines, separately excited fields for said machines, means for energizing said fields at preselected values relative to each other, and means controlling said rotary source of D. C. voltage to vary the D. C. voltage from a maximum of one polarity through zero to a maximum of opposite polarity.

4. A power conversion and A. C. motor control system of the character described comprising a source of variable direct current voltage, means electrically associated therewith for controlling said voltage in magnitude and polarity, two separately excited direct current commutator machines, each having an armature winding and a shaft mechanically connected to the shaft of the other, one of said machines being a rotary inverter, means connecting said source of variable D. C. voltage in parallel to the commutators of said machines whereby they operate at a speed and in a direction determined by the magnitude and polarity of the applied voltage, said rotary inverter having its armature winding electrically connected to a plurality of slip rings feeding an A. C. distribution circuit at a frequency and phase rotation dependent upon the speed and direction of rotation of said machines, a polyphase motor having a primary winding connected to said circuit, and means electrically associated with said two machines for establishing a predetermined voltage bias causing circulation of current of zero phase rotation in said A. C. distribution circuit and in said primary winding of said motor prior to acceleration of said two machines from zero speed in either direction.

5. A system for converting variable D. C. voltage into biased voltage variable frequency A. C. comprising in combination a D. C. generator providing a variable voltage output, a rotary inverter supplied from said generator and having an output circuit to which it supplies polyphase alternating current at a frequency dependent upon the rotative speed of the inverter, a torque controlling device mechanically connected to the shaft of said inverter, and means varying in accordance with the voltage of said generator for controlling said device to regulate the rate of acceleration and deceleration of said rotary inverter thereby to force said inverter to provide a continually biased voltage to frequency output.

6. A system for converting variable D. C. voltage into biased voltage variable frequency A. C. comprising in combination a motor-generator set including a D. C. generator and a motor for driving the same at constant speed and means for controlling the field excitation of said generator to vary its output voltage incrementally from a maximum of one polarity through zero to a maximum of the opposite polarity, a rotary inverter supplied from said generator and providing a polyphase A. C. output at a variable frequency dependent upon the magnitude of the D. C. voltage supplied to said inverter from said generator, and a separately excited dynamo mechanically connected to said inverter and electrically connected to said generator for imposing a control torque on said inverter responsively to build up of generator voltage from zero potential.

7. A system for converting variable D. C. voltage into biased voltage variable frequency A. C. comprising in combination a motor-generator set including a D. C. generator and a motor for driving the same at constant speed and means for controlling the field excitation of said generator to vary its output voltage incrementally from a maximum of one polarity through zero to a maximum of the opposite polarity, a rotary inverter supplied from said generator and providing a polyphase A. C. output at a variable frequency dependent upon the magnitude of the D. C. voltage supplied to said inverter from said generator, a separately excited dynamo mechanically connected to said inverter and electrically connected to said generator and means electrically associated with said inverter and with said dynamo for providing a predetermined voltage bias in said A. C. output.

8. In an electrical system for supplying A. C. energy at variable frequency and biased voltage with respect to frequency for variable speed operation of an A. C. motor, the combination with a D. C. generator and field control means therefor to control the output voltage thereof in polarity and magnitude, of a separately excited rotary inverter supplied by said generator for converting the D. C. input into a polyphase A. C. output of a frequency and phase rotation, dependent upon the speed and direction of rotation of said inverter, the D. C. input appearing at the output side of the inverter as a bias voltage of zero phase rotation at zero speed of the inverter, a separately excited D. C. machine supplied by said generator, means mechanically connecting said D. C. machine to said inverter, said D. C. machine controlling the torque requirements of said inverter and forcing it to establish a predetermined magnitude of voltage bias with respect to frequency at the output side of the inverter, and circuit means connecting the output side of said inverter to said A. C. motor.

9. In a system of the character described, the combination with a driven rotary device adapted to be operated at various speeds, of a plurality of A. C. motors which are to follow the speed pattern of said device, means operatively connected to said rotary device for providing a D. C. control voltage proportional to the speed thereof, a D. C. generator having a field winding excited by said control voltage, whereby said generator provides a D. C. voltage proportional to the speed of said device, a separately excited rotary inverter supplied by said generator and providing an A. C. output of a frequency dependent upon the rotative speed of the inverter, a distribution circuit supplied by said inverter to which said A. C. motors are connected in parallel, a separately excited dynamo electric machine mechanically connected to said inverter and electrically connected to said generator, and means electrically associated with said inverter and with said dynamo electric machine to provide a predetermined magnitude of voltage bias with respect to frequency in said distribution circuit and in said A. C. motors.

10. In a system for supplying an alternating current motor with biased voltage, variable frequency alternating current, the combination with a D. C. generator and field control means therefor to control the output voltage thereof in polariy and magnitude, of two separately excited direct current machines, each having an armature and a shaft mechanically connected to the shaft of the other, a circuit connecting said generator with the armature of said two machines in parallel, one of said machines being a rotary inverter having its armature electrically connected to a plurality of slip rings to provide a polyphase A. C. output, and a feeder circuit electrically connecting said slip rings and said alternating current motor.

11. In an electrical system for supplying A. C. energy at variable frequency to an A. C. motor for variable speed operation thereof, the combination of a source of variable D. C. voltage, a rotary inverter having an armature winding connected to said voltage source and a plurality of slip rings connected to said motor for providing a polyphase A. C. output at a variable frequency dependent upon the speed of said inverter, and a separately excited dynamo mechanically connected to said inverter and electrically connected to said D. C. voltage source for imposing a control torque on said inverter upon feeding voltage from said D. C. source into said inverter and said dynamo.

12. In a system of the character described, the combination with a rotary device adapted to be operated at various speeds, of a plurality of alternating current motors which are to follow the speed pattern of said device, a source of direct current power, means operatively connected to said rotary device for controlling said power source and rendering the D. C. voltage therefrom proportional to the speed of said rotary device, a separately excited rotary inverter having an armature winding electrically connected to a plurality of slip rings for providing polyphase alternating currents of a frequency dependent upon the rotative speed of said inverter, a distribution circuit connected to said slip rings to which said motors are connected in parallel, a separately excited dynamo mechanically connected to said inverter and having an armature winding, a circuit extending from said power source to said inverter and said dynamo for impressing the D. C. voltage on their armature windings in parallel and effect variable speed operation thereof, and electrical means electrically operatively connected to said inverter and to said dynamo to control the torque actions thereof and the current flow through said armature windings and through said motors in addition to that afforded by variations in said D. C. voltage in response to speed changes of said rotary device.

References Cited in the file of this patent
UNITED STATES PATENTS

| | | |
|---|---|---|
| 620,336 | Lamme | Feb. 28, 1899 |
| 1,392,084 | Smith | Sept. 27, 1921 |
| 2,437,611 | Morrison | Mar. 9, 1948 |
| 2,629,075 | Deschmann | Feb. 17, 1953 |